US012572379B2

(12) United States Patent
Chen et al.

(10) Patent No.: US 12,572,379 B2
(45) Date of Patent: Mar. 10, 2026

(54) STATIC TRUSTED EXECUTION ENVIRONMENT FOR INTER-ARCHITECTURE PROCESSOR PROGRAM COMPATIBILITY

(71) Applicant: Tenstorrent USA, Inc., Austin, TX (US)

(72) Inventors: Zhimin Chen, San Jose, CA (US); Kenneth Dockser, Austin, TX (US); Yasuo Ishii, Palo Alto, CA (US); Alex Ousherovitch, Foster City, CA (US)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 18/666,801

(22) Filed: May 16, 2024

(65) Prior Publication Data

US 2025/0284530 A1 Sep. 11, 2025

Related U.S. Application Data

(60) Provisional application No. 63/563,951, filed on Mar. 11, 2024.

(51) Int. Cl.
*G06F 9/46* (2006.01)

(52) U.S. Cl.
CPC .................................... *G06F 9/467* (2013.01)

(58) Field of Classification Search
None
See application file for complete search history.

(56) References Cited

U.S. PATENT DOCUMENTS

2018/0196956 A1* 7/2018 Mishra ................ G06F 21/6218
2024/0273030 A1* 8/2024 Ball ........................ G06F 13/28

FOREIGN PATENT DOCUMENTS

WO 2022198619 A1 9/2022

OTHER PUBLICATIONS

D. Kwon et al. (2021). A Hardware Platform for Ensuring OS Kernel Integrity on RISC-V. Electronics.
F. Ciravegna, (2023). Detecting compromise in TEE applications at runtime (Doctoral dissertation, Politecnico di Torino).
International Search Report and Written Opinion from International Application No. PCT/US25/19261 dated May 29, 2025, 7 pages.
ARM Architecture Reference Manual Security Extensions Supplement. ARM DDI 0309F. Copyright © 2004, 2005 ARM limited.

* cited by examiner

*Primary Examiner* — Syed A Roni
(74) *Attorney, Agent, or Firm* — Daylight Law, P.C.

(57) ABSTRACT

Computer-implemented methods and associated hardware for static trusted execution environment for inter-architecture processor program compatibility are disclosed herein. A device (e.g., a Reduced Instruction Set Computing-Five (RISC-V) device), may emulate a static trusted execution environment (e.g., ARM TrustZone) using physical memory protection (PMP). A regular world may have access to only a portion of an address space of the device, while a secure world may have access to the full address space. A secure world identifier (SWID) may be stored in a configuration status register (CSR) only accessible by a mode (e.g., machine mode). When an entry is added to a translation lookaside buffer (TLB), the SWID may be added as part of a tag to differentiate secure world entries from regular world entries.

23 Claims, 6 Drawing Sheets

Regular World

Secure World

Regular World

Secure World

Regular World

Secure Worlds

320

Overview

325

First Secure
World View

330

Second Secure
World View

335

Third Secure
World View

Translation
Lookaside Buffer 410

Translation
Lookaside Buffer 405

Virtual Address
(Regular World)

| SWID | TAG | PHYSICAL ADDRESS |
|------|-----|------------------|
|      |     |                  |
| SWID | A   | 0_FFFE_101E_0C1A |
|      | A   | 0_1CB0_CC10_B101 |
|      |     |                  |
|      |     |                  |
|      |     |                  |
|      |     |                  |
|      |     |                  |
|      |     |                  |
|      |     |                  |
|      |     |                  |
|      |     |                  |

| INDEX | TAG |
|-------|-----|

Physical Address
(Regular World)

Application
1

Virtual Address
(Secure World)

| SWID | INDEX | TAG |
|------|-------|-----|

Physical Address
(Secure World)

Application
2

Custom Machine Address Translation and Protection CSR (matp)

FIG. 6

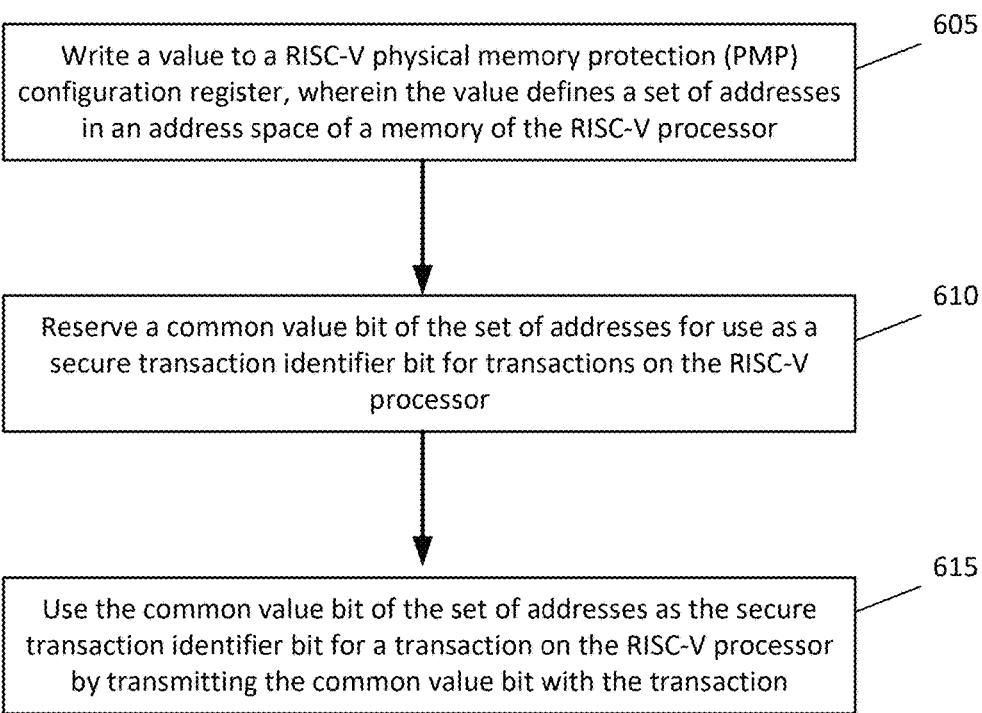

Write a value to a RISC-V physical memory protection (PMP) configuration register, wherein the value defines a set of addresses in an address space of a memory of the RISC-V processor

605

Reserve a common value bit of the set of addresses for use as a secure transaction identifier bit for transactions on the RISC-V processor

610

Use the common value bit of the set of addresses as the secure transaction identifier bit for a transaction on the RISC-V processor by transmitting the common value bit with the transaction

615

600

STATIC TRUSTED EXECUTION ENVIRONMENT FOR INTER-ARCHITECTURE PROCESSOR PROGRAM COMPATIBILITY

CROSS REFERENCE TO RELATED APPLICATIONS

This application claims the benefit of provisional application 63/563,951 filed on Mar. 11, 2024, which is incorporated by reference herein in its entirety for all purposes.

BACKGROUND

Software programs are crafted differently for various processor architectures, such as x86, Microprocessor without Interlocked Pipeline Stages (MIPS), Power, Scalable Processor ARChitecture (SPARC), Advanced Reduced Instruction Set Computer Machine (ARM), and Reduced Instruction Set Computing-Five (RISC-V), owing to the distinct instruction sets and underlying hardware characteristics associated with each architecture. The instruction set architecture (ISA) dictates the set of instructions a processor may execute, requiring developers to tailor their code to efficiently utilize these instructions. X86 processors, commonly found in desktops and laptops, adhere to a complex instruction set computing (CISC) architecture, supporting a diverse range of instructions with variable lengths. In contrast, ARM processors, prevalent in mobile devices and embedded systems, follow a reduced instruction set computing (RISC) architecture, emphasizing a streamlined set of instructions for improved efficiency and power savings. RISC-V, an open-standard ISA gaining popularity, similarly employs a RISC architecture, providing flexibility and customization. Developers must navigate these architectural nuances, incorporating platform-specific optimizations and, in some cases, creating distinct code paths for different processor types to ensure software maximizes the capabilities of the target architecture, facilitating optimal performance and resource utilization across diverse computing platforms.

Several processor architectures incorporate specialized security features to enhance the protection of sensitive data and systems. ARM's TrustZone is a notable example of such security features. TrustZone creates a secure environment within the processor, isolating sensitive operations from the regular execution environment. It divides the processor into two distinct realms—a secure world and a normal world—each with its own set of resources and privileges. The normal world is sometimes referred to as a regular world. This enables the secure execution of critical tasks, such as handling cryptographic operations, managing secure boot processes, and safeguarding sensitive data. TrustZone plays a role in securing mobile devices, embedded systems, and other applications where maintaining the integrity and confidentiality of data is paramount. Beyond ARM, other processor architectures also incorporate security features like Intel's SGX (Software Guard Extensions) and AMD's Secure Memory Encryption. These security features are designed to protect against a variety of threats, including unauthorized access, tampering, and exploitation of vulnerabilities, thereby bolstering the overall security posture of systems and devices.

SUMMARY

This disclosure relates to computer-implemented methods and associated hardware for static trusted execution environment (STEE) for inter-architecture processor program compatibility. An STEE may organize and use some features (e.g., physical memory protection) of a device (e.g., RISC-V) to provide an isolated computing environment for software. For example, a first and second software may both run on the same central processing unit (CPU) core; the first software may be inside of an isolating computing environment, while the second software runs outside the isolated computing environment. Even if the second software is compromised, then the first software may still be protected. A static trusted execution environment may also contain some micro-architecture optimizations to improve the performance of an associated device and may protect against some special attacks. Some STEEs may not be compatible with some devices. Some devices, however, may be able to emulate an STEE even if the STEE is not fully compatible with the device. In this way, the device may still be able to run secure software.

A device (e.g., RISC-V), may emulate an STEE (e.g., ARM TrustZone) using physical memory protection (PMP). A normal world of the device may have access to only a portion of an address space of the device, while a secure world may have access to the full address space. The secure and normal worlds may have other unique privileges as well. One world may not be capable of invalidating translation lookaside buffer (TLB) entries that belong to another world. Pending transactions may need to be complete before a world switch is initiated. A secure world identifier (SWID) may be a configuration status register (CSR) only accessible by a mode (e.g., Machine Mode). When an entry is added to a TLB, the SWID may be added as part of a tag to differentiate secure world entries from normal world entries. For a memory access, even a cache hit may still be required to pass a PMP check.

When checking a virtual address against TLB entries, the associated SWID may be compared against the SWID field in the TLB entries. A TLB match may require a SWID match. The associated SWID of a memory access may show which world issued the memory access. There may be different ways to implement the associated SWID, for example the associated SWID may equal the SWID field in a machine address translation and protection (matp).

In specific embodiments of the invention, a method for emulating an ARM TrustZone using a RISC-V processor is provided. The method comprises: writing a value to a RISC-V PMP configuration register, wherein the value defines a set of addresses in an address space of a memory of the RISC-V processor; reserving a common value bit of the set of addresses for use as a secure transaction identifier bit for transactions on the RISC-V processor; and using the common value bit of the set of addresses as the secure transaction identifier bit for a transaction on the RISC-V processor by transmitting the common value bit with the transaction.

In specific embodiments of the invention, a non-transitory computer-readable medium is provided. The non-transitory computer-readable medium stores instructions which, when executed by a processor, cause the processor to conduct a method for emulating an ARM TrustZone using a RISC-V processor. The method comprises: writing a value to a RISC-V PMP configuration register, wherein the value defines a set of addresses in an address space of a memory of the RISC-V processor; reserving a common value bit of the set of addresses for use as a secure transaction identifier bit for transactions on the RISC-V processor; and using the common value bit of the set of addresses as the secure transaction identifier bit for a transaction on the RISC-V processor by transmitting the common value bit with the transaction.

In specific embodiments of the invention, a apparatus is provided. The apparatus comprises: a RISC-V processor comprising RISC-V memory; and a RISC-V PMP configuration register; wherein the RISC-V processor is configured to: write a value in the RISC-V PMP, wherein the value defines a set of addresses in an address space of the RISC-V memory; reserve a common value bit of the set of addresses for use as a secure transaction identifier bit for transactions on the RISC-V processor; and use the common value bit of the set of addresses as the secure transaction identifier bit for a transaction on the RISC-V processor by transmitting the common value bit with the transaction.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 provides a block diagram in accordance with specific embodiments of the inventions disclosed herein.

DETAILED DESCRIPTION

Figure 1:
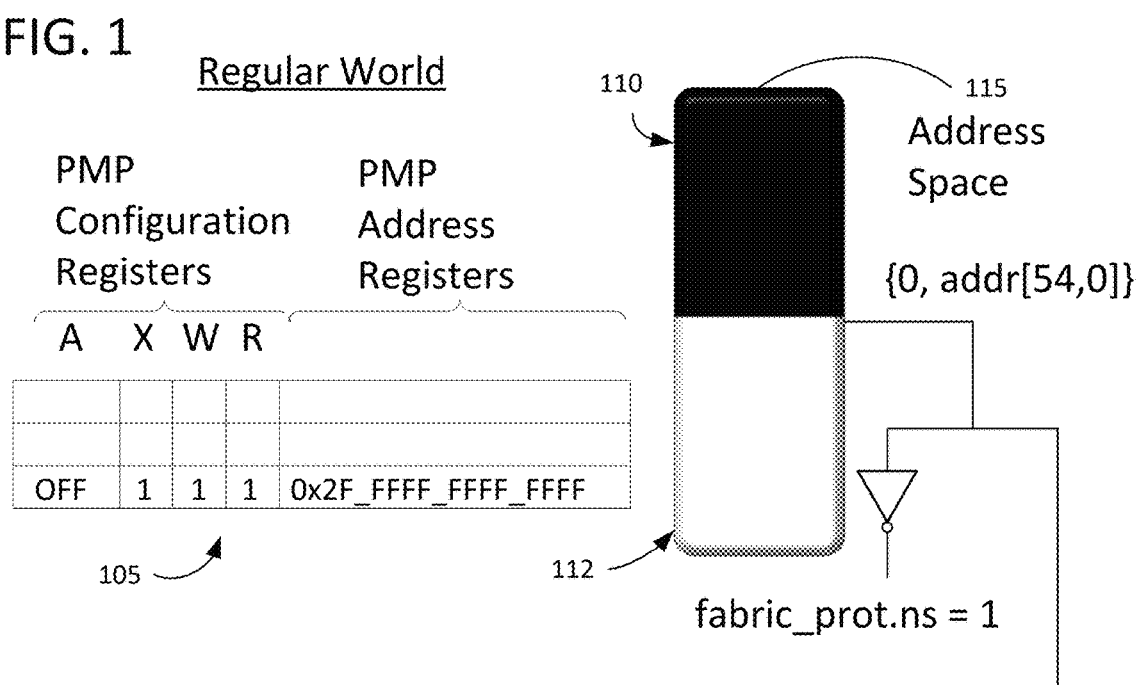
FIG. 1 provides a block diagram in accordance with specific embodiments of the inventions disclosed herein.
Figure 1:
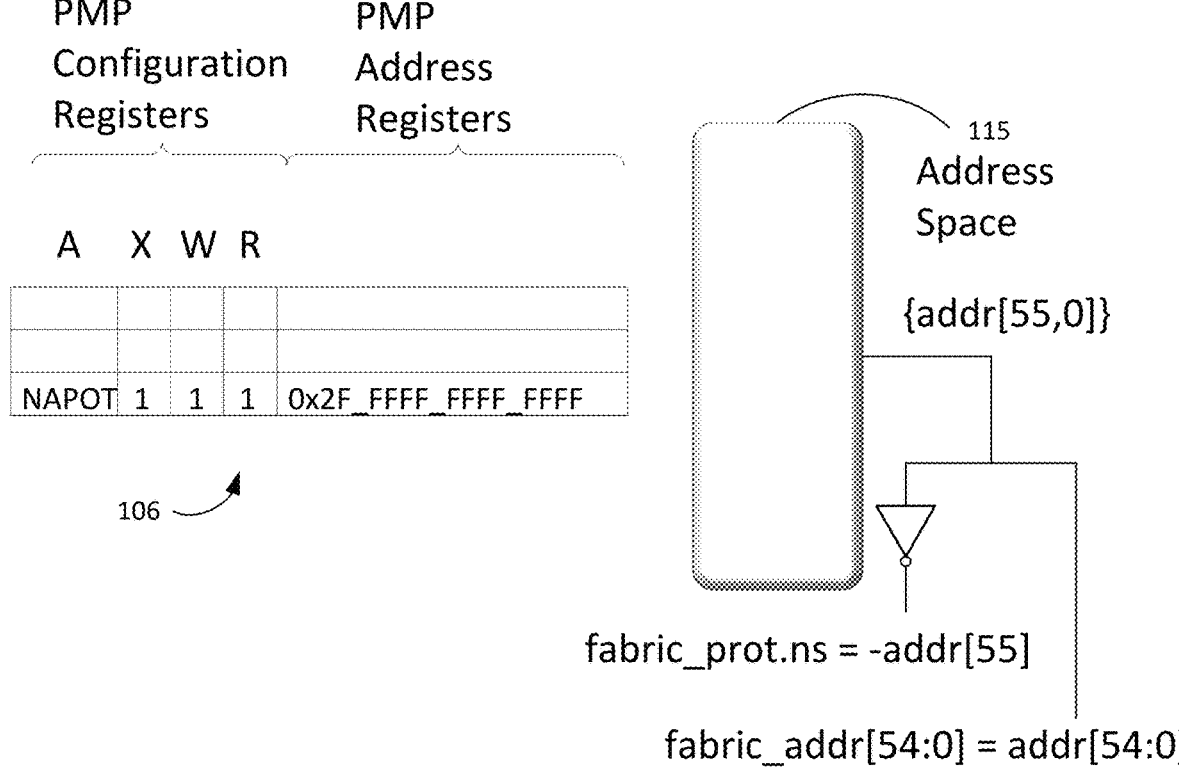

Systems and methods related to computer processor security features and inter-architecture compatibility are disclosed herein. In specific embodiments of the invention, a processor that is compliant with the RISC-V standard may be modified to emulate a security feature from an alternative processor architecture such as the ARM TrustZone. Accordingly, the modified RISC-V processor may be used to execute applications that are designed for operation with those security features. This approach thereby increases the ease with which programs may be ported from alternative processors to RISC-V and commensurately increases the utility of a RISC-V processor that is modified in accordance with specific embodiments of the inventions disclosed herein.

In specific embodiments of the inventions disclosed herein, a security feature that is to be emulated on a processor is a feature which provides an isolated computing environment for secure execution. The isolated computing environment may be referred to as the secure world of the processor. The isolated computing environment may exist in parallel with the regular world such that the processor may be executing an unsecure program in the regular world at the same time as it executes a secure program in the secure world. The security feature may assure that the memory used by the secure world is not accessible to programs operating in the regular world. This feature may be enabled by using special identifiers that are added to transactions on the processor. As used herein, the term "transaction" refers to an interaction between two components in a computing architecture such as a memory read request or a memory write request, and also refers to read and write requests to status and configuration registers of the processor. The ARM TrustZone is an example of this type of security feature. These security features may be emulated on a processor using specific embodiments of the inventions disclosed herein.

Specific embodiments of the inventions disclosed herein include microarchitecture optimizations such as the routing of a shared value address to be used as a secure transaction identifier bit for a transaction, the addition of another column to one or more translation lookaside buffers (TLB) for purposes of storing a secure world identifier (SWID), and the use of a configuration status register (CSR) for purposes of storing a SWID. A secure transaction identifier bit is a bit that may be attached to a transaction and used by the components of the processor to determine if the transaction is an authorized secure transaction or if it is an unsecure transaction. In specific embodiments of the inventions disclosed herein, these microarchitecture features are only available to, or may only be modified by, a high privilege operating mode of the processor. The secure operating mode may be the Machine Mode of a RISC-V processor. For example, only the Machine Mode of a RISC-V processor may be allowed to enable the use of the secure transaction identifier bit. As another example, only the Machine Mode of a RISC-V processor may be authorized to attach the SWID for a secure world to a virtual address. As another example, only a Machine Mode of a RISC-V processor may be authorized to write the SWID to the CSR.

FIG. 1 provides a block diagram to illustrate how a shared value address may be used as a secure transaction identifier for a transaction. A secure transaction identifier may be used by request destinations in the processing architecture to determine if a request is secure or not secure and to thereby either deny the request, service it in a secure manner, or service it in an unsecure manner. The blocks on the left of the diagram represent PMP registers 105 and 106 of a RISC-V processor and their settings for the regular world (PMP register 105) and the secure world (PMP register 106). The four columns on the left are the PMP configuration registers and the column on the right is the PMP address register. In specific embodiments, the processor is a RISC-V processor and only the Machine Mode may set the values in these PMP registers 105 and 106. The A value is the address matching value. It is a two-bit value which may be set to a zero value to disable the entry, set to one for a top of range address matching, set to two for a naturally aligned four-byte region, or set to three for a naturally aligned power-of-two region (NAPOT). The A value may operate with the PMP address register value to define the portion of the address space that the configuration applies to. The X, W, and R values may be single bit values which indicate if fetching, writing, and reading from the address is allowed. The PMP address registers define the addresses that the configuration applies to.

FIG. 1 includes a PMP configuration register setting for a regular world (in PMP register 105) in which the A value is set to 0 or "OFF". For example, the entire address space 115 could be {0, addr[54,0]}. Accordingly, the regular world is not able to access the addresses associated with the encoding in the PMP address registers. For example, the regular world may only have access to lower portion 112 of address space 115, and not to upper portion 110 of address space 115. FIG. 1 illustrates a processor with an address bus of length 56. Those of ordinary skill in the art will recognize that RISC-V processors may have address buses with different lengths than 56 and that this is not a limitation of the inventions disclosed herein. FIG. 1 illustrates how the value on the address bus for the regular world will always have a most significant bit (MSB) output of zero and that the 55 least significant bits (LSBs) may be used to address all the memory available to the regular world. Accordingly, the MSB may be inverted and used to emulate an ns or "non-secure" bit as used in processors that utilize the ARM TrustZone. More generally, this MSB may be used as a secure transaction identifier bit. This bit may be delivered in place of the ns bit in all transactions routed by the processor to provide for the emulation of an ARM TrustZone. In embodiments in which the processor is a RISC-V processor, the use of the MSB of the address bit may be enabled for this purpose using the Machine Mode of the processor.

FIG. 1 also includes a PMP configuration register setting for a secure world (in PMP register 106) in which the A value is not set to 0 (e.g., the A value corresponds to NAPOT). Accordingly, the secure world has access to the entire address space 115. The entire address space 115 may correspond to both upper portion 110 of address space 115 (blocked from the regular world) and lower portion 112 of address space 115 (accessible to the regular world). Lower portion 112 and upper portion 110 may each correspond to the same number of addresses (e.g., each portion is half of address space 115). As an example, the entire address space 115 could be {addr[55,0]}, alternatively written as {addr [55], addr[54:0]} to emphasize the role of the A value in determining the accessible address space. FIG. 1 illustrates how the value on the address bus for the secure world may have an output value of one or zero for the MSB so that all the addresses in address space 115 are available to the secure world. As illustrated, the inversion of the MSB may still be used to emulate the ns bit, as used in processors that utilize the ARM TrustZone, or may be used to more generally serve as a secure transaction identifier bit. When the MSB is high and upper portion 110 of address space 115 is being accessed, the ns bit will be zero which will indicate that any associated transaction is secure. When the MSB is low and lower portion 112 of address space 115 is being accessed, the ns bit will be one which will indicate that any associated transaction is not secure. This bit may be delivered in place of the ns bit in all transactions routed by the processor to provide for this emulation. In embodiments in which the processor is a RISC-V processor, the use of the MSB of the address bit may be enabled for this purpose using the Machine Mode of the processor.

While the approach described with reference to FIG. 1 shows the address space being divided into upper and lower halves (e.g., upper portion 110 and lower portion 112), different divisions of the address space are possible. Furthermore, alternative numbers of worlds can be used to divide up the address space using the approaches disclosed herein. In some embodiments of the invention, the common value bit mentioned above may be used to emulate the ns bit in an ARM processor utilizing an ARM TrustZone. The benefit of this approach is that it will facilitate smooth migration from ARM cores to RISC-V cores using the approaches disclosed herein because TrustZone aware subsystems may be kept and reused. The software for the TrustZone will only need minimal changes to run on a RISC-V core which uses the approaches disclosed herein.

Figure 2:
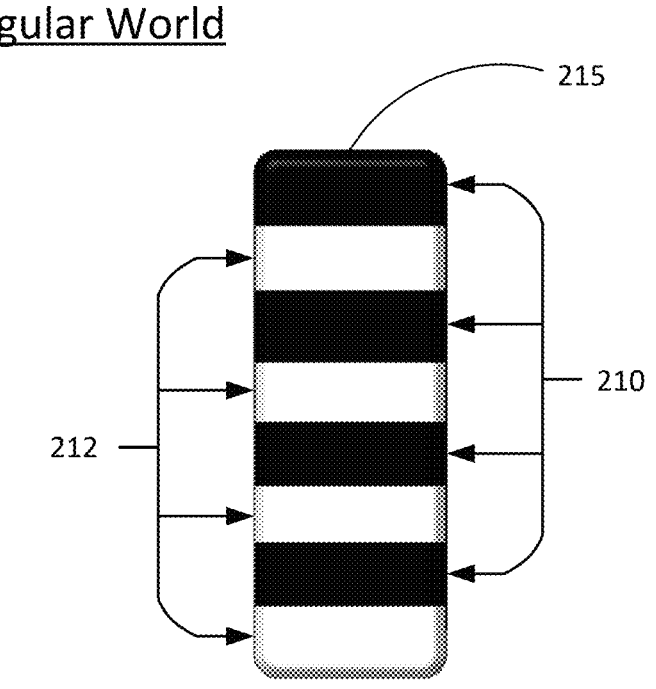
FIG. 2 provides an address space in accordance with specific embodiments of the inventions disclosed herein.
Figure 2:
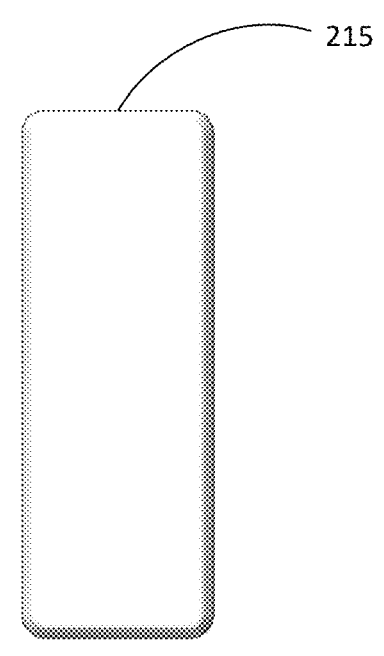

FIG. 2 shows an example of address space 215 divided into different stripes or portions where different bits are shared between the addresses in the secure world and the regular world. In this example, the regular world has access to stripes 212 of address space 215 while stripes 210 are blocked. Although four stripes 212 and four stripes 210 of address space 215 are shown, any quantity of stripes may be possible. The quantity of stripes 212 accessible to the regular world and the quantity of stripes 210 restricted to the regular world may be different quantities. The secure world has access to the entire address space 215. Unlike in the example of FIG. 1, the MSB of an address may not alone determine whether the regular world has access to the associated memory. Instead, additional bits of the address may further establish the security of the associated memory. For example, three bits (e.g., the first three bits) of an address may be required to determine whether the address is associated with the secure world or the regular world in address space 215. As another example, an address bit other than the first bit (e.g., the $54^{th}$ address bit) may have a common value for each world, and the address space would be divided into four contiguous sections instead of two.

Figure 3:
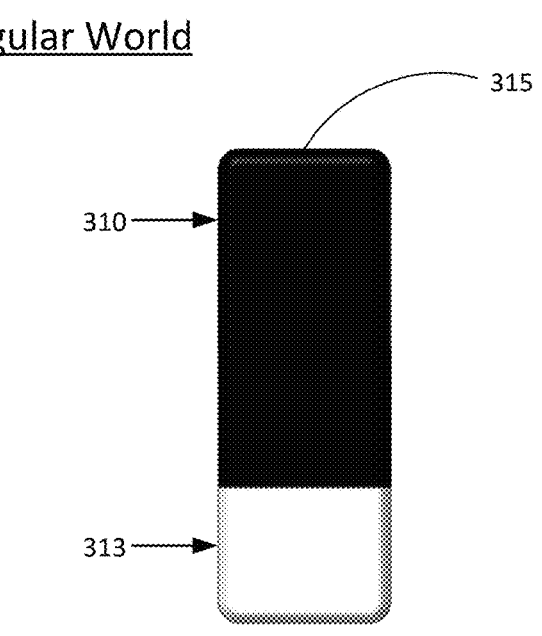
FIG. 3 provides an address space in accordance with specific embodiments of the inventions disclosed herein.
Figure 3:
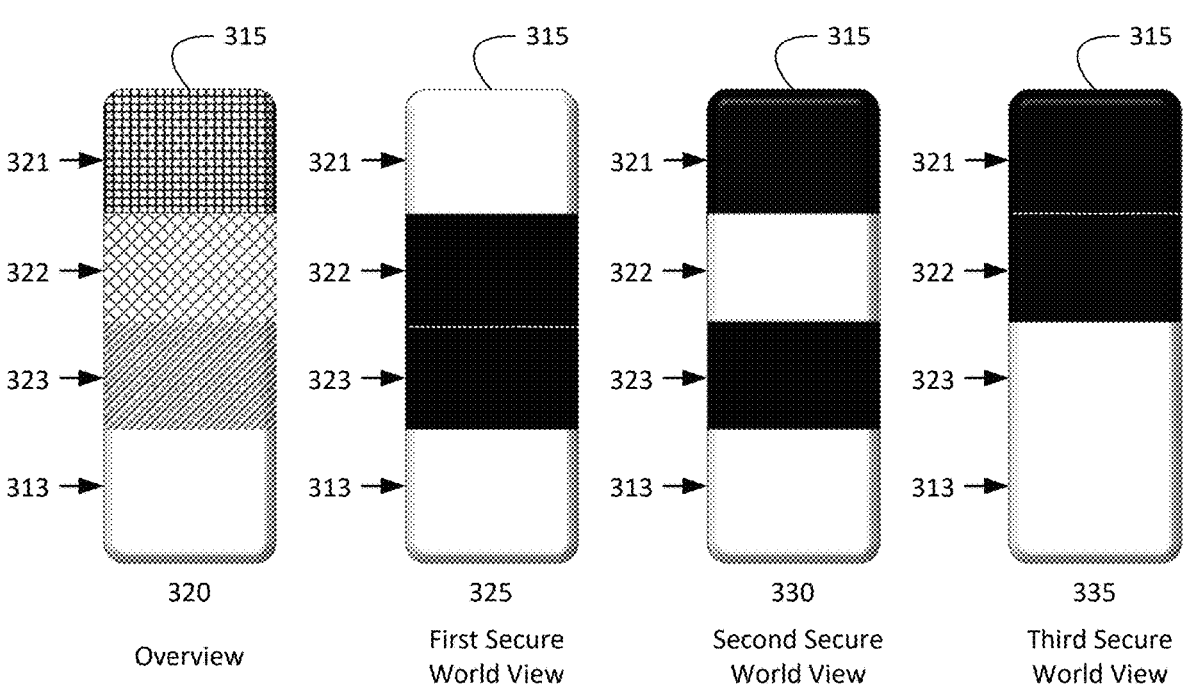

FIG. 3 shows an example of address space 315 where different portions of the address space are assigned to different worlds including a regular world and three secure worlds. In this example, multiple PMP configuration registers are available for different worlds so that different portions of the address space may be assigned to different worlds. Address space 315 is divided into portions. Although any quantity of portions are possible, four are shown in this example. Additionally, although shown as roughly equal in proportion, any portion associated with a secure world may be associated with a different fraction of the address space relative to other secure worlds or relative to the regular world. View 320 shows portions 321, 322, 323, and 313. Portion 321 is associated with a first secure world, portion 322 is associated with a second secure world, portion 323 is associated with a third secure world, and portion 313 is associated with the regular world. Out of the entire address space 315, the regular world has access to portion 313 and is blocked from portion 310 (e.g., the portions 321, 322, and 323 combined).

View 325 shows that the first secure world (assigned to or associated with portion 321) has access to portions 321 and portion 313 (associated with the regular world) and is blocked from portions 322 and 323. View 330 shows that the second secure world (assigned to or associated with portion 322) has access to portion 322 and portion 313 and is blocked from portions 321 and 323. View 335 shows that the third secure world (assigned to or associated with portion 323) has access to portion 323 and portion 313 and is blocked from portions 321 and 322.

In this and other embodiments, the different portions of address space 315 could share common values across multiple bits in order to distinguish them from other worlds (e.g., the $55^{th}$ and $54^{th}$ bit have a common value for a first world while the $55^{th}$ and $53^{rd}$ bit have a common value for a second world). Accordingly, a secure transaction identifier bit could be formed for specific worlds using a more complex logic gate than an inverter such as an AND gate etc. in order to create specific secure transaction identifiers for the different worlds.

Processors that are in accordance with the concepts described with reference to FIG. 1, FIG. 2, and FIG. 3 may be used to execute methods for emulating an ARM Trust-Zone using a RISC-V processor. The methods comprise writing a value to an address definition portion of a RISC-V PMP configuration register. The value may define a set of addresses in an address space of a memory of the RISC-V processor. The methods may further comprise reserving a common value bit of the set of addresses for use as a secure transaction identifier bit for transactions on the RISC-V processor. For example, the common value bit may be the MSB on the address bus in the example of FIG. 1. The methods may further comprise using the common value bit of the set of addresses as the secure transaction identifier bit for a transaction on the RISC-V processor by transmitting the common value bit with the transaction. For example, the common value bit may be the MSB on the address bus and the MSB on the address bus may be routed with a request for that address in the header of a memory request to identify the request as either a secure or nonsecure request.

In specific embodiments of the invention, the common value bit mentioned above may be used to emulate the ns bit in an ARM processor utilizing an ARM TrustZone. The benefit of this approach is that it will facilitate smooth migration from ARM cores to RISC-V cores using the approaches disclosed herein because TrustZone aware sub-systems may be kept and reused. The software for the TrustZone will only need minimal changes to run on a RISC-V core which uses the approaches disclosed herein.

In specific embodiments of the invention, the methods disclosed above may further include enabling, in an enablement, the reserving of the common value bit and the use of the common value bit by writing an activation value to a portion of the RISC-V PMP configuration register. The methods may further include using the activation value to emulate the TrustZone Enabled Bit (TZEN) of an ARM processor utilizing an ARM TrustZone. This method may utilize custom logic added to the RISC-V CPU in order to toggle an A value in one or more PMP configuration registers between zero and one of the three values that defines the address space of the secure world using a bit having the characteristics of the TZEN bit as an input.

In specific embodiments of the invention, the enablement mentioned in the prior paragraph is conducted by a Machine Mode of a RISC-V processor. In these embodiments, the Machine Mode may be the only mode authorized to conduct the enablement. For example, the microarchitecture of the processor could be configured such that only a Machine Mode of the processor may set the values in the A entry of the PMP configuration registers.

In specific embodiments of the invention, a microarchitecture modification in the form of the addition of a column to one or more TLBs may be used to allow a processor to emulate a security feature of another processor architecture (e.g., to allow a RISC-V core to emulate an ARM TrustZone feature). A TLB is a component of a computer's memory management unit (MMU), which is part of the processor. The TLB is specifically associated with the virtual memory subsystem of a computer system. Its primary function is to cache the translations from virtual addresses to physical addresses, which helps to expedite the memory access process. A TLB is typically located within the processor's memory management unit, alongside other components responsible for managing the translation of virtual addresses to physical addresses. It may act as a high-speed cache for storing recently accessed address translations, reducing the latency of memory access by avoiding repeated and time-consuming translations in the main memory or page tables. The TLB is an essential part of the memory management process, contributing to the efficient mapping of virtual addresses to their corresponding physical locations in the system's memory (e.g., RAM).

Figure 4:
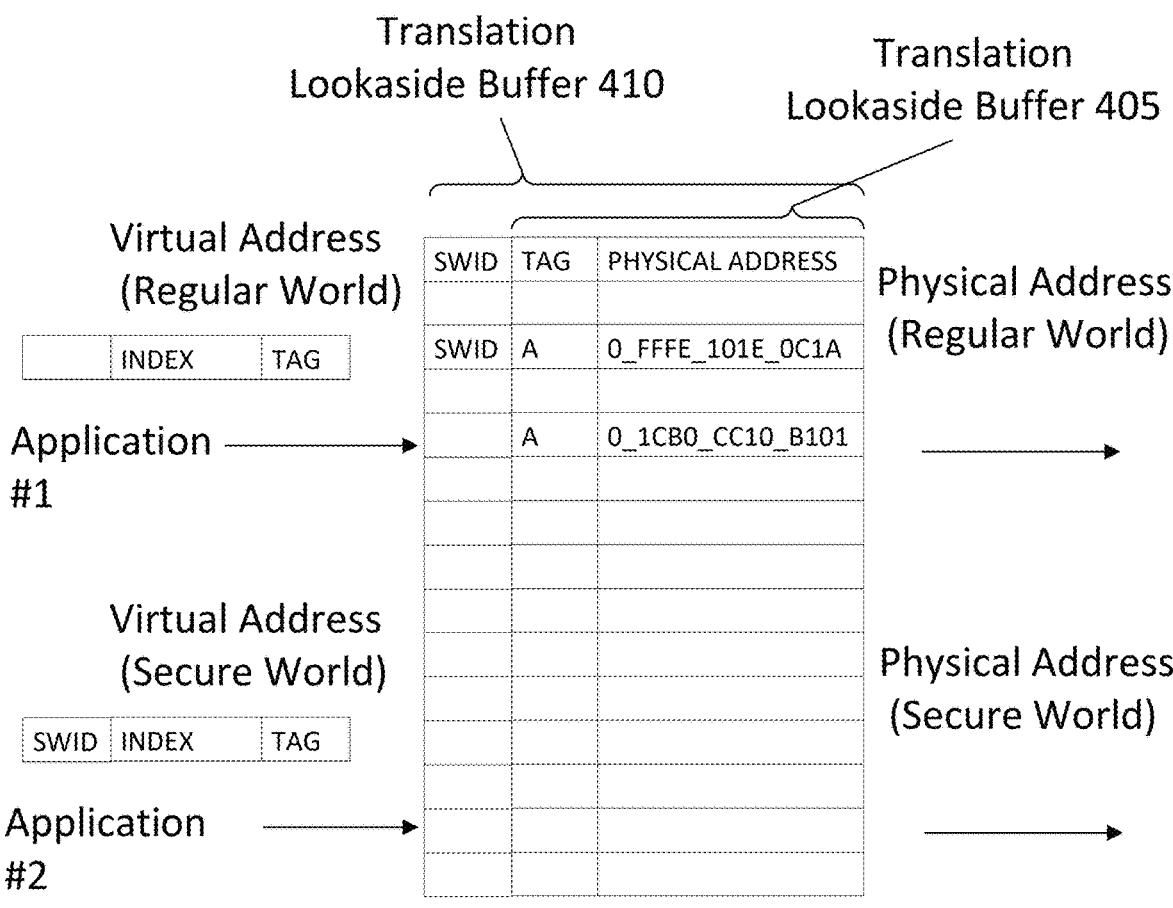
FIG. 4 provides a translation lookaside buffer (TLB) system in accordance with specific embodiments of the inventions disclosed herein.

FIG. 4 illustrates a TLB system including two variations of modified TLBs to facilitate the emulation of security features for a processor architecture. As illustrated, TLB 405 includes a tag column and a physical address column. As shown, virtual addresses may arrive with an index and a tag, and TLB 405 may be searched to find the tag and deliver the corresponding physical address. Generally, two applications such as Application #1 and Application #2 illustrated next to the incoming virtual addresses may not be aware of the operation of the other and may thereby produce conflicting entries in TLB 405 in which two different sets of virtual addresses are mapped in a conflicting way to the same physical addresses. In particular, the regular world may not be aware of the operation of the secure world and the secure world may use physical addresses that are available to the regular world. Accordingly, the processor may need to flush TLB 405 when switching between allowing transactions for the secure world and the regular world.

In specific embodiments of the invention, one or more TLBs in a processing architecture are modified to include another column for a SWID, for example TLB 410. The SWID may be a special code which is stored in a CSR such as the one shown in FIG. 5. The SWID may be attached to transactions in the processor and have one value when the transaction is part of the secure world and another value when the transaction is part of the regular world. The SWID may be the lowest 7 bits of the CSR. The CSR may be a custom machine address translation and protection (matp) CSR. The CSR may be configured so that it may only be written to be a privileged mode of the processor. For example, if the processor were a RISC-V processor the CSR could be configured such that it could only be written to by a Machine Mode of the processor. In embodiments in which the secure world and regular world are the only worlds the processor supports, then the SWID may be a single bit. However, in embodiments in accordance with FIG. 5, multiple worlds may be supported with the different values of the SWID encoding different worlds. FIG. 4 illustrates how the SWID may improve utilization of TLB 410 in the case of multiple worlds. While not illustrated, TLB 410 may include additional columns with fields such as a process ID and a virtual machine ID. These fields may be referenced in addition to the SWID to identify whether the transaction is part of the secure or the regular world. In some situations, an access from a secure world might happen to have identical values for the process ID. These other fields do not subsume the function of the SWID.

As shown in FIG. 4, one row of TLB 410 includes a SWID value in the SWID column. The row links a tag A with a given physical address. The row is an entry that is used by the secure world application. FIG. 4 also includes one row of the TLB that does not include SWID value in the SWID column. The row links tag A with a different physical address. Through the use of a SWID column, the processor may disambiguate between the two mappings of tags to physical addresses by first checking if a virtual address includes a SWID for a secure world, searching for tag ambiguities, and resolving them by checking to see if one of the tag entries includes SWID value that matches the SWID value of the virtual address. Using this approach, TLB 410 may not need to be flushed every time the processor switches contexts from executing an application in the regular world to executing an application in the secure world.

Figure 5:
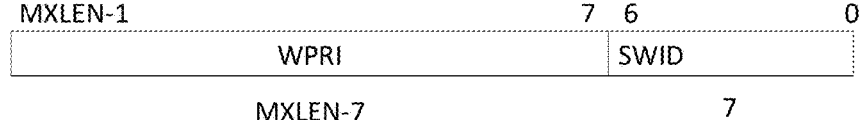
FIG. 5 provides a custom machine address translation and protection (matp) configuration status register (CSR) in accordance with specific embodiments of the inventions disclosed herein.

FIG. 5 provides a custom matp configuration status register (CSR) in accordance with specific embodiments of the inventions disclosed herein. The matp CSR may be a MXLEN-bit register and may be readable and writable by Machine Mode only. The register may hold a SWID field (e.g., a SWIDLEN-bit SWID field). The number of implemented SWID bits may be determined by writing one to every bit position in the SWID field, then reading back the value in matp to see which bit positions in the SWID field hold a one. The LSBs of the SWID may be implemented first. In this example, the maximum number of bits the SWID field holds is 7; accordingly, the number of worlds (e.g., secure and regular) supported is $2^n$ where n can be from 0 to 7.

When creating a TLB entry, the associated SWID of the memory access may be copied to the tag of the TLB entry. When checking a virtual address against TLB entries, the associated SWID may be compared against the SWID field in the TLB entries. A TLB match may always require the SWIDs to match. Global mapping of TLB entries may only apply within a world. In other words, for a global mapping TLB entry, a successful match may not only require the virtual address to match, but also require the SWID to match.

The associated SWID of a memory access may show which world issued the memory access. The associated SWID may be implemented such that the associated SWID equals the SWID field in matp. This may require the Machine Mode software to wait until all memory accesses in one world are complete before changing SWID field in matp. TLB entry invalidation may apply within the associated world. In other words, one world may not be capable of invalidating TLB entries that belong to another world.

FIGS. 4 and 5 may be used to execute the method described in FIG. 6 disclosed below, as well as other methods disclosed herein, including where the methods include additional steps not described in the method of FIG. 6.

FIG. 6 provides a block diagram in accordance with the methods described herein. The systems described with respect to FIGS. 4 and 5 may be used to execute method 600.

At 605, a value is written to a RISC-V PMP configuration register. The value defines a set of addresses in an address space of a memory of the RISC-V processor.

At 610, a common value bit of the set of addresses is reserved for use as a secure transaction identifier bit for transactions on the RISC-V processor.

At 615, the common value bit reserved at 610 is used as the secure transaction identifier bit for a transaction on the RISC-V processor. Using the common value bit may include transmitting the common value bit with the transaction.

The method 600 may further comprise accessing a TLB in a memory management unit using a secure world identifier in the transaction. The translation lookaside buffer may include a column for the secure world identifier. In embodiments in which the processor is a RISC-V processor, the RISC-V processor uses the secure world identifier to verify transactions have access to a secure world of the RISC-V processor. The methods may further comprise emulating a non-secure table identifier on the RISC-V processor using the secure world identifier.

In specific embodiments of the inventions disclosed herein, the methods may include additional steps which set the secure world identifier such that it is available to be attached to virtual address transactions from secure software or from the Machine Mode of the processor. The processes may include writing a value for the secure world identifier to a configuration status register using a Machine Mode of the RISC-V processor. The Machine Mode may be the only mode of the processor that is authorized to write to the configuration status register. The methods may further include accessing the secure world identifier from the configuration status register when the secure world identifier is written to the translation lookaside buffer. In specific embodiments, the secure world identifier is a multi-bit value such that it may represent multiple secure, or otherwise distinct, worlds. In specific embodiments, the translation lookaside buffer supports multiple secure worlds simultaneously on the RISC-V processor.

A processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate (DDR) dynamic random-acess memory (DRAM). The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method for emulating TrustZone using a Reduced Instruction Set Computing-Five (RISC-V) processor comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction; and using the common value bit of the set of addresses to emulate a non-secure bit.

2. The method of claim 1, further comprising:

enabling, in an enablement, the reserving of the common value bit and the use of the common value bit by writing an activation value to a portion of the RISC-V PMP configuration register; and using the activation value to emulate a TrustZone enabled bit.

3. The method of claim 2, wherein:

the enablement is conducted by a Machine Mode of the RISC-V processor; and the Machine Mode is the only mode authorized to conduct the enablement.

4. The method of claim 1, further comprising:

accessing a translation lookaside buffer (TLB) in a memory management unit using a secure world identifier in the transaction;

wherein the translation lookaside buffer includes a column for the secure world identifier; and wherein the RISC-V processor uses the secure world identifier to verify whether transactions have access to a secure world of the RISC-V processor.

5. The method of claim 4, further comprising:

emulating a non-secure table identifier on the RISC-V processor using the secure world identifier.

6. The method of claim 4, further comprising:

writing a value for the secure world identifier to a configuration status register using a Machine Mode of the RISC-V processor; and accessing the secure world identifier from the configuration status register when the secure world identifier is written to the translation lookaside buffer.

7. The method of claim 4, wherein:

the secure world identifier is a multi-bit value; and the translation lookaside buffer supports multiple secure worlds simultaneously on the RISC-V processor.

8. A non-transitory computer-readable medium storing instructions which, when executed by a Reduced Instruction Set Computing-Five (RISC-V) processor cause the RISC-V processor to conduct a method for emulating a TrustZone comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction; and using the common value bit of the set of addresses to emulate a non-secure bit.

9. The non-transitory computer-readable medium of claim 8, the method further comprising:

enabling, in an enablement, the reserving of the common value bit and the use of the common value bit by writing an activation value to a portion of the RISC-V PMP configuration register; and using the activation value to emulate a TrustZone enabled bit.

10. The non-transitory computer-readable medium of claim 9, wherein:

the enablement is conducted by a Machine Mode of the RISC-V processor; and the Machine Mode is the only mode authorized to conduct the enablement.

11. The non-transitory computer-readable medium of claim 8, the method further comprising:

accessing a translation lookaside buffer (TLB) in a memory management unit using a secure world identifier in the transaction;

wherein the translation lookaside buffer includes a column for the secure world identifier; and wherein the RISC-V processor uses the secure world identifier to verify whether transactions have access to a secure world of the RISC-V processor.

12. The non-transitory computer-readable medium of claim 11, the method further comprising:

emulating a non-secure table identifier on the RISC-V processor using the secure world identifier.

13. The non-transitory computer-readable medium of claim 11, the method further comprising:

writing a value for the secure world identifier to a configuration status register using a Machine Mode of the RISC-V processor; and accessing the secure world identifier from the configuration status register when the secure world identifier is written to the translation lookaside buffer.

14. The non-transitory computer-readable medium of claim 11, wherein:

the secure world identifier is a multi-bit value; and the translation lookaside buffer supports multiple secure worlds simultaneously on the RISC-V processor.

15. An apparatus comprising:

a processor;

a memory; and a physical memory protection (PMP) configuration register;

wherein the processor is configured to:

write a value in the PMP configuration register, wherein the value defines a set of addresses in an address space of the memory;

reserve a common value bit of the set of addresses for use as a secure transaction identifier bit for transactions on the processor;

use the common value bit of the set of addresses as the secure transaction identifier bit for a transaction on the processor by transmitting the common value bit with the transaction; and use the common value bit of the set of addresses to emulate a non-secure bit.

16. The apparatus of claim 15, wherein the processor is a RISC-V processor and is further configured to:

enable, in an enablement, the reserving of the common value bit and the use of the common value bit by writing an activation value to a portion of the PMP configuration register; and use the activation value to emulate a TrustZone enabled bit.

17. The apparatus of claim 15, wherein the processor further comprises:

a translation lookaside buffer (TLB) in a memory management unit using a secure world identifier in the transaction; and a column in the TLB for the secure world identifier;

wherein the processor uses the secure world identifier to verify transactions have access to a secure world of the processor.

18. A method for emulating TrustZone using a Reduced Instruction Set Computing-Five (RISC-V) processor comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction;

enabling, in an enablement, the reserving of the common value bit and the use of the common value bit by writing an activation value to a portion of the RISC-V PMP configuration register; and using the activation value to emulate a TrustZone enabled bit.

19. A method for emulating TrustZone using a Reduced Instruction Set Computing-Five (RISC-V) processor comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction; and accessing a translation lookaside buffer (TLB) in a memory management unit using a secure world identifier in the transaction;

wherein the translation lookaside buffer includes a column for the secure world identifier; and wherein the RISC-V processor uses the secure world identifier to verify whether transactions have access to a secure world of the RISC-V processor.

20. A non-transitory computer-readable medium storing instructions which, when executed by a Reduced Instruction Set Computing-Five (RISC-V) processor cause the RISC-V processor to conduct a method for emulating a TrustZone comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction;

enabling, in an enablement, the reserving of the common value bit and the use of the common value bit by writing an activation value to a portion of the RISC-V PMP configuration register; and using the activation value to emulate a TrustZone enabled bit.

21. A non-transitory computer-readable medium storing instructions which, when executed by a Reduced Instruction Set Computing-Five (RISC-V) processor cause the RISC-V processor to conduct a method for emulating a TrustZone comprising:

writing a value to a RISC-V physical memory protection (PMP) configuration register, wherein the value defines a set of addresses in an address space of a memory of the RISC-V processor;

reserving a common value bit of the set of addresses for use as a secure transaction identifier bit for transactions on the RISC-V processor;

using the common value bit of the set of addresses as the secure transaction identifier bit for a transaction on the RISC-V processor by transmitting the common value bit with the transaction; and accessing a translation lookaside buffer (TLB) in a memory management unit using a secure world identifier in the transaction;

wherein the translation lookaside buffer includes a column for the secure world identifier; and wherein the RISC-V processor uses the secure world identifier to verify whether transactions have access to a secure world of the RISC-V processor.

22. An apparatus comprising:

a processor;

a memory; and a physical memory protection (PMP) configuration register;

wherein the processor is configured to:

write a value in the PMP configuration register, wherein the value defines a set of addresses in an address space of the memory;

reserve a common value bit of the set of addresses for use as a secure transaction identifier bit for transactions on the processor;

use the common value bit of the set of addresses as the secure transaction identifier bit for a transaction on the processor by transmitting the common value bit with the transaction;

enable, in an enablement, the reserving of the common value bit and the use of the common value bit by writing an activation value to a portion of the PMP configuration register; and use the activation value to emulate a TrustZone enabled bit.

23. An apparatus comprising:

a processor;

a memory; and a physical memory protection (PMP) configuration register;

wherein the processor is configured to:

write a value in the PMP configuration register, wherein the value defines a set of addresses in an address space of the memory;

reserve a common value bit of the set of addresses for use as a secure transaction identifier bit for transactions on the processor; and use the common value bit of the set of addresses as the secure transaction identifier bit for a transaction on the processor by transmitting the common value bit with the transaction; and wherein the processor: (i) further comprises a translation lookaside buffer (TLB) in a memory management unit using a secure world identifier in the transaction, and a column in the TLB for the secure world identifier; and (ii) uses the secure world identifier to verify transactions have access to a secure world of the processor.

* * * * *